(12) United States Patent
Qi et al.

(10) Patent No.: US 11,874,453 B2
(45) Date of Patent: Jan. 16, 2024

(54) OPTICAL SYSTEM, METHOD FOR CALIBRATING OPTICAL SYSTEM, AND SEQUENCING SYSTEM

(71) Applicant: GENEMIND BIOSCIENCES COMPANY LIMITED, Shenzhen (CN)

(72) Inventors: Jifang Qi, Shenzhen (CN); Zhiliang Zhou, Shenzhen (CN); Zefei Jiang, Shenzhen (CN); Qin Yan, Shenzhen (CN)

(73) Assignee: GENEMIND BIOSCIENCES COMPANY LIMITED, Guangdong (CN)

( * ) Notice: Subject to any disclaimer, the term of this patent is extended or adjusted under 35 U.S.C. 154(b) by 453 days.

(21) Appl. No.: 17/311,179

(22) PCT Filed: Sep. 29, 2019

(86) PCT No.: PCT/CN2019/109045
§ 371 (c)(1),
(2) Date: Jun. 4, 2021

(87) PCT Pub. No.: WO2020/119226
PCT Pub. Date: Jun. 18, 2020

(65) Prior Publication Data
US 2021/0373314 A1  Dec. 2, 2021

(30) Foreign Application Priority Data

Dec. 12, 2018  (CN) .......................... 201811516793.7
Dec. 12, 2018  (CN) .......................... 201822089550.1

(51) Int. Cl.
*G02B 21/36*   (2006.01)
*G02B 27/10*   (2006.01)
(Continued)

(52) U.S. Cl.
CPC ....... *G02B 21/361* (2013.01); *G01N 21/6458* (2013.01); *G02B 21/0004* (2013.01);
(Continued)

(58) Field of Classification Search
CPC .. G02B 21/361; G02B 21/0004; G02B 21/02; G02B 21/06; G02B 21/16; G02B 27/10;
(Continued)

(56) References Cited

U.S. PATENT DOCUMENTS

2005/0270543 A1* 12/2005 Ge .......................... G02B 5/005
                                                              356/512

FOREIGN PATENT DOCUMENTS

| CN | 102478700 A | 5/2012 |
|----|-------------|--------|
| CN | 103278934 A | 9/2013 |

(Continued)

OTHER PUBLICATIONS

Saito, et al., "Dual-colour microscopy of single fluorophores bound to myosin interacting with fluorescently labelled actin using anti-Stokes fluorescense," Journal of Microscopy, vol. 188, Pt. 3, Dec. 1997, pp. 255-263.

(Continued)

*Primary Examiner* — Courtney D Thomas
(74) *Attorney, Agent, or Firm* — Dilworth IP, LLC

(57) ABSTRACT

An optical system including a first light source, a first lens, and a light splitting module, wherein the light splitting module has a first splitter, a second lens, a first camera and a second camera, the first lens is configured for receiving a first light beam from the first light source and collimating the first light beam onto a sample, and for receiving and collimating a light beam from the sample, the second lens is configured for focusing the collimated light beam from the first lens to the first camera and the second camera, the first splitter is configured for splitting the focused light beam (Continued)

from the second lens into a second light beam and a third light beam, the first camera is configured for receiving the second light beam, and the second camera is configured for receiving the third light beam.

20 Claims, 9 Drawing Sheets

(51) Int. Cl.
*G01N 21/64* (2006.01)
*G02B 21/00* (2006.01)
*G02B 21/02* (2006.01)
*G02B 21/06* (2006.01)
*G02B 21/16* (2006.01)
*G02B 27/30* (2006.01)

(52) U.S. Cl.
CPC ............ *G02B 21/02* (2013.01); *G02B 21/06* (2013.01); *G02B 21/16* (2013.01); *G02B 27/10* (2013.01); *G02B 27/30* (2013.01); *G01N 2021/6478* (2013.01)

(58) Field of Classification Search
CPC .... G02B 27/30; G02B 21/241; G02B 21/245; G02B 27/141; G01N 21/6458; G01N 2021/6478; G01N 21/648; G01N 2021/6421; G01N 2021/6441
See application file for complete search history.

(56) References Cited

FOREIGN PATENT DOCUMENTS

| CN | 104293648 A | 1/2015 |
| CN | 105068232 A | 11/2015 |
| CN | 105371757 A | 3/2016 |
| CN | 106460034 A | 2/2017 |
| CN | 108286936 A | 7/2018 |
| CN | 209759461 U | 12/2019 |
| WO | 2004048936 A2 | 6/2004 |
| WO | 2009042862 A1 | 4/2009 |
| WO | 2021057200 A1 | 4/2021 |

OTHER PUBLICATIONS

Sanderson, et al., "Fluorescence Microscopy," HHS Public Access, Cold Spring Harb Protoc.; 2014(10): pdb.top071795. doi:10.1101/pdb.top071795, 36 pages.

European Search Report in related EP Application No. 19896106.2 dated Dec. 20, 2021, 11 pages.

PCT International Search Report for PCT/CN2019/109045; dated Dec. 13, 2019; 4 pages.

* cited by examiner

OPTICAL SYSTEM, METHOD FOR CALIBRATING OPTICAL SYSTEM, AND SEQUENCING SYSTEM

TECHNICAL FIELD

The present disclosure relates to the technical field of optical detection, and in particular to an optical system, a method for calibrating an optical system, and a sequencing system.

BACKGROUND

An optical imaging system can realize submicron resolution and is a powerful tool for research. For example, in the field of biological sample detection, some optically detectable groups/compounds/structures are used to label target biomolecules, and signals from these labels are acquired using an optical imaging system, thereby tracking or detecting the target biomolecules.

On a platform for nucleic acid sequencing based on optical imaging (e.g., a sequencing platform based on sequencing by synthesis), sequencing is generally implemented by adding a nucleotide modifier with an optically detectable label (e.g., a fluorescent molecule) for binding a template (target nucleic acid sequence), and determining the bases at corresponding positions of the template via exciting the fluorescent molecule. It is desirable that the optical imaging system of the sequencing platform may feature compactness, insusceptibility to other components and close fit with other related components, thereby implementing stable, continuous and quick signal acquisition and outputting clear images. There's still a need for designing and building an optical imaging system with solutions or improvements for the aforementioned purposes.

SUMMARY

The present disclosure provides an optical system for gene sequencing, a method for calibrating an optical system and a sequencing system.

In one embodiment of the present disclosure, provided is an optical system comprising a first light source, a first lens, and a light splitting module, wherein the light splitting module comprises a first splitter, a second lens, a first camera and a second camera, the first lens is configured for receiving a first light beam from the first light source and collimating the first light beam onto a sample, and for receiving and collimating a light beam from the sample, the second lens is configured for focusing the collimated light beam from the first lens to the first camera and the second camera, the first splitter is configured for splitting the focused light beam from the second lens into a second light beam and a third light beam, the first camera is configured for receiving the second light beam, and the second camera is configured for receiving the third light beam.

In the optical system based on the splitting optical path design, the light beam passes through the second lens and then through the splitter, resulting in a shortened overall length of the optical path and a reduced spatial requirement, thus facilitating the miniaturization of the optical system.

Generally, the sample carries an optically detectable label, for example, one or more fluorescent molecular labels. Laser is a conventional fluorescence excitation light source. The fluorescent molecular labels can be excited by the laser to emit fluorescence with different wavelengths.

The inventor further builds and designs another optical system, in which the splitting is performed in a parallel optical path of a microscope (between objective and tube lenses), as shown in FIG. 15. Fluorescence is split in the parallel optical path of the microscope, namely the fluorescence is collimated after passing through the objective lens, and is split by a splitter 90 to form a plurality of splitting optical paths. Each light beam in the splitting optical paths is focused to a camera 91 or 92 through a tube lens 93 or 94.

The inventor found, through comparative tests, that the optical system comprising a splitting optical path resulting from splitting in a converging optical path has an optical path of a smaller overall length, smaller dimensions and a small number of optical elements, thus facilitating the miniaturization and industrial manufacture of the optical system.

In one embodiment of the present disclosure, provided is a sequencing system comprising a platform for carrying a sample and the optical system according to any one of the aforementioned embodiments. The above description of the technical features and advantages of the optical system according to any one of the embodiments of the present disclosure is further applicable to the sequencing system in this embodiment, and will not be repeated hereinafter.

In one embodiment of the present disclosure, a method for calibrating an optical system is provided, wherein the optical system comprises a light splitting module comprising a second lens, a first splitter, a first camera and a second camera, and the second lens, the first splitter, and the first camera are sequentially arranged along an optical axis of the second lens, the method comprising: emitting a collimated light beam to the second lens using a collimator comprising a target, the target comprising one or more patterns; converging the collimated light beam to the first splitter through the second lens and splitting the collimated light beam into a second light beam and a third light beam through the first splitter; receiving, by the first camera, the second light beam to acquire a first image of the pattern; receiving, by the second camera, the third light beam to acquire a second image of the pattern; and adjusting an angle and/or position of the first camera and/or the second camera to align the contrasts of the first image and the second image. According to the method for calibrating the optical system, the light splitting module is adjusted as a module independent from the whole optical system, which eliminates the limit of adjusting the whole optical system, conveniently realizes the perpendicularity of a plurality of cameras and an optical axis, and is suitable for calibrating an optical system comprising a splitting optical path.

Additional aspects and advantages of embodiments of the present disclosure will be partially set forth in the following description, and will partially become apparent from the following description or be appreciated by practice of the present disclosure.

BRIEF DESCRIPTION OF THE DRAWINGS

The aforementioned and/or additional aspects and advantages of the present disclosure will become apparent and easily understood from the description of the embodiments in reference to the following drawings, among which.

DETAILED DESCRIPTION

Figure 1:
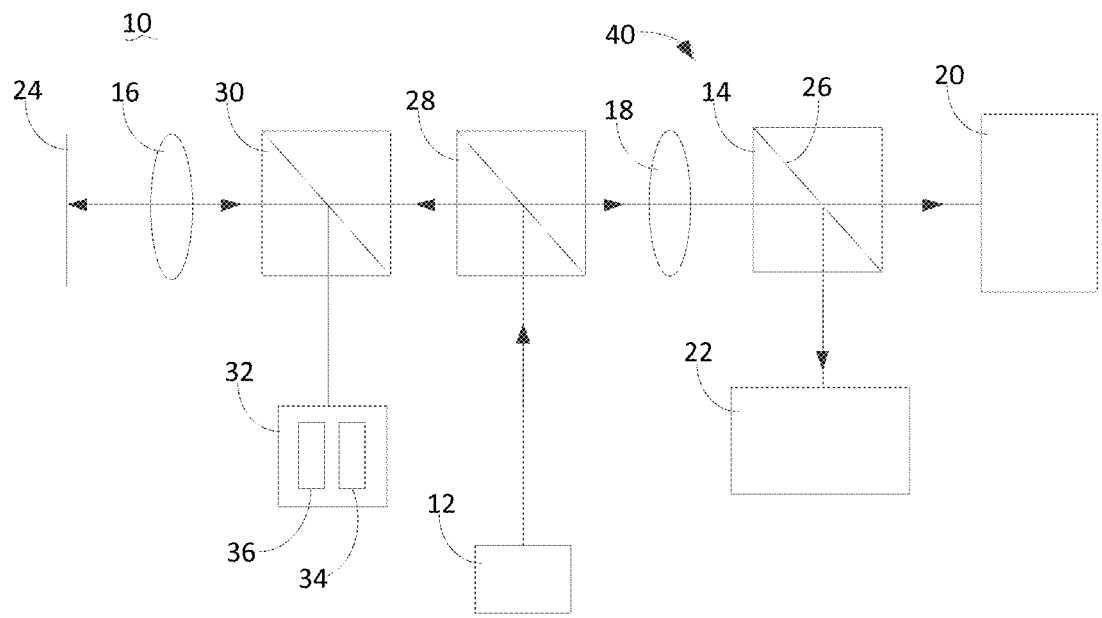
FIG. 1 is a structural schematic of the optical system according to the embodiments of the present disclosure.

The embodiments of the present disclosure are described in detail below, and the examples of the embodiments are shown in the accompanying drawings, throughout which identical or similar reference numerals represent identical or similar elements or elements having identical or similar functions. The embodiments described below by reference to the accompanying drawings are exemplary and are merely intended to explain the present disclosure rather than be construed as limiting the present disclosure.

In the description of the present disclosure, the terms "first" and "second" are used for descriptive purposes only rather than construed as indicating or implying relative importance or sequence, or implicitly indicating the number of indicated technical features. Therefore, features defined with "first" and "second" may explicitly or implicitly include one or more of the features. In the description of the present disclosure, "a plurality of" means two or more than two, unless otherwise specifically defined.

In the description of the present disclosure, unless otherwise defined, the terms "mounted", "joined" and "connected" should be comprehended in their broad sense. For example, "connect" may be "fixedly connect", "detachably connect" or "integrally connect"; "mechanically connect", "electrically connect" or "communicate with each other"; or "directly interconnect", "indirectly interconnect through an intermediate", "the communication between the interiors of two elements" or "the interaction between two elements". For those of ordinary skill in the art, the specific meanings of the aforementioned terms in the present disclosure can be understood according to specific conditions.

Referring to FIG. 1, provided in one embodiment of the present disclosure is an optical system 10 comprising a first light source 12, a first lens 16 and a light splitting module 40, wherein the light splitting module 40 comprises a first splitter 14, a second lens 18, a first camera 20 and a second camera 22. The first lens 16 is configured for receiving a first light beam from the first light source 12 and collimating the first light beam onto a sample 24, and for receiving and collimating a light beam from the sample 24. The second lens 18 is configured for focusing the collimated light beam from the first lens 16 to the first camera 20 and the second camera 22. The first splitter 14 is configured for splitting the focused light beam from the second lens 18 into a second light beam and a third light beam. The first camera 20 is configured for receiving the second light beam. The second camera 22 is configured for receiving the third light beam.

According to the optical system 10, the light beam is focused by the second lens 18, and then split by the splitter 14 into the second light beam and the third light beam. As such, the use of optical elements and the length of the splitting optical path can be reduced, which shortens the total optical path of the optical system, and facilitates miniaturization and industrial manufacture of the optical system 10.

Specifically, the sample 24 may be a nucleic acid sample, and the nucleic acid sample may be placed in a reaction device, such as a flowcell. The first light source 12 may be a laser light source. In one example, the flowcell comprises a substrate, wherein the substrate is provided with a channel, and the substrate is provided with glass. When sequencing is performed using a sequencing system of the optical system, the target nucleic acid, an enzyme, a nucleotide reagent or solution with a fluorescent label and others are mixed in the channel for reaction under a certain condition. The first light source 12 emits a laser onto a specific field of view of the flowcell through the first lens 16, and fluorophores in the field of view are excited to emit fluorescence. The fluorescence is focused to the first splitter 14 through the first lens 16 and the second lens 18. The first splitter 14 splits the converged fluorescence light beam into the second light beam and the third light beam. The first camera 20 receives the second light beam and the second camera 22 receives the third light beam to acquire a first image and a second image of the field of view, respectively.

Figure 2:
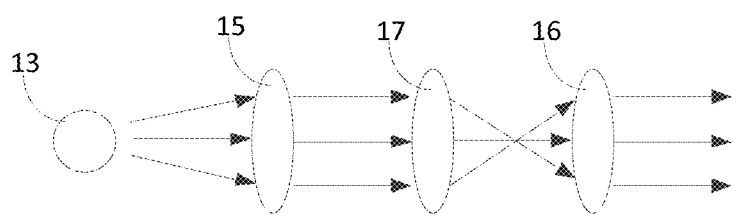
FIG. 2 is a structural schematic of the first light source according to the embodiments of the present disclosure.

In one example, as shown in FIG. 2, the first light source 12 may comprise a first light emitter 13 and a third lens 15. The first light beam is a light beam emitted by the first light emitter 13 and collimated by the third lens 15. The first light beam is focused on a back focal plane of the first lens 16 by a fourth lens 17 and then collimated onto the sample 24 by the first lens 16. In one example, the first light source 12 further comprises a fiber coupler, for example, a single mode fiber coupler. Specifically, the optical system 10 is a total internal reflection optical system. The collimated light beam (parallel light beam) passing through the first lens 16 is incident on the surface of the glass/cover-glass at an angle larger than the critical angle, thus generating total internal reflection and an evanescent field (evanescent wave) at the lower/bottom surface of the (flowcell) glass/cover-glass. The fluorescence emitted by the excited fluorescent molecule in the evanescent field is received by the first lens 16.

When the light beam emitted by the first light source 12 excites the fluorophores of the sample 24, the light beam received by the first lens 16 is the light beam emitted by the fluorophores of the sample 24.

Image sensors of the first camera 20 and the second camera 22 may be CCDs or CMOSs. Preferably, the image sensors of the first camera 20 and the second camera 22 are of the same type, for example, both CCDs or both CMOSs. The first splitter 14 may be a dichroic mirror.

In the illustrated embodiment, the second light beam is the transmitted light beam of the first splitter 14, and the third light beam is the reflected light beam of the first splitter 14.

Figure 3:
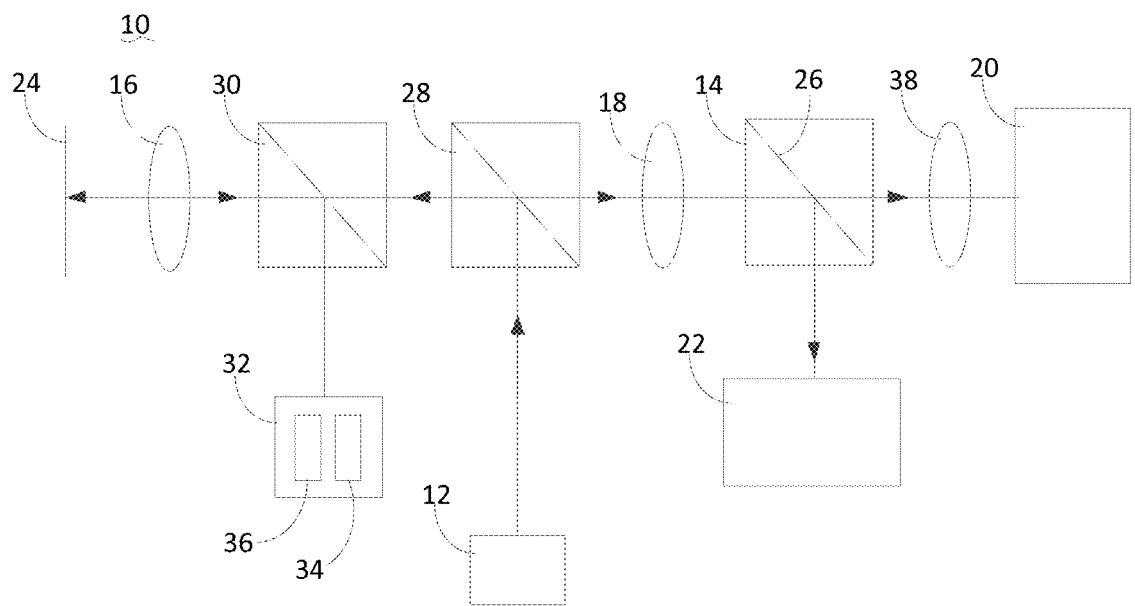
FIG. 3 is another structural schematic of the optical system according to the embodiments of the present disclosure.

In some embodiments, the first camera 20 and the second camera 22 are arranged at 90 degrees or 270 degrees. This facilitates disposing a plurality of cameras including the first camera 20 and the second camera 22 into the optical system within a limited space. Specifically, in the orientation shown in FIG. 1, the first splitter 14 has a first reflecting surface 26 at an included angle of 45 degrees to the horizontal plane. A part of the light beam incident on the first reflecting surface 26 in the horizontal direction is reflected and deflected by 90 degrees, reaching the second camera 22, and another part of the light beam incident on the first reflecting surface 26 in the horizontal direction passes through the first reflecting surface 26 and is incident on the first camera 20. In FIGS. 1 and 3, the first camera 20 and the second camera 22 are arranged at 90 degrees in the clockwise direction or 270 degrees in the counterclockwise direction. In one example, the sample has two fluorescent labels, for example Cy3 and Atto647N, with emission bands of 550-620 nm and 650-750 nm, respectively (peaks of about 564 nm and 670 nm, respectively). The first splitter 14 is a dichroic mirror having a high transmittance for spectrum ranged 550-620 nm and a high reflectance for spectrum above 650 nm.

The nucleotide reagents with the fluorescent labels include A, T, C and G reagents in separate containers. In one example, the four nucleotides have the same fluorescent label. In DNA sequencing, each sequencing reaction includes four base extension reactions, which are sequential additions of the four nucleotides and the acquisitions of corresponding images.

In one example, the four nucleotides are divided in two pairs, and the two nucleotides of each pair respectively carry a first fluorescent label and a second fluorescent label. The first fluorescent label and the second fluorescent label can be excited to emit different fluorescence. In a two-color sequencing using the four nucleotides, each sequencing reaction comprises two base extension reactions. When a sequencing is performed using a sequencing system comprising the optical system 10, the target nucleic acid, an enzyme, two nucleotide reagents or solutions with the first fluorescent label or the second fluorescent label and others are mixed in the channel for reaction under a certain condition. The first light source 12 simultaneously emits a first laser and a second laser onto a specific field of view on the flowcell through the first lens 16. The first fluorescent label and the second fluorescent label of the field of view are respectively excited by the first laser and the second laser to emit a first fluorescence and a second fluorescence. The first fluorescence and the second fluorescence are converged to the first splitter 14 (dichroic mirror) through the first lens 16 and the second lens 18. The dichroic mirror splits the converged first fluorescence and second fluorescence. The first fluorescence is focused onto an image plane of the first camera 20 and the second fluorescence is focused onto an image plane of the second camera 22, thereby giving a first image and a second image of the first fluorescence and the second fluorescence of the field of view, respectively. Base identification/sequencing is implemented based on the nucleotide addition sequence and information of the first image and the second image of different sequencing reactions.

In another example, the four nucleotides carry fluorescent label a, fluorescent label b, fluorescent labels a-b and no label, respectively, wherein the fluorescent label a and the fluorescent label b can be excited to emit different fluorescences. In a four-color sequencing using the four nucleotides, each sequencing reaction comprises one base extension reaction. When sequencing is performed using a sequencing system comprising the optical system 10, the target nucleic acid, an enzyme, the four nucleotide reagents or solutions and others are mixed in the channel for reaction under a certain condition. The first light source 12 simultaneously emits a first laser and a second laser onto a specific field of view of the flowcell through the first lens 16. The fluorescent labels in the field of view are excited by the first laser and the second laser to emit fluorescences. The fluorescences are converged to the first splitter 14 (dichroic mirror) through the first lens 16 and the second lens 18. The dichroic mirror splits the fluorescences into fluorescence from the fluorescent label a and fluorescence from the fluorescent label b. The fluorescence from the fluorescent label a is focused onto an image plane of the first camera 20 and the fluorescence from the fluorescent label b is focused onto an image plane of the second camera 22, thereby giving a first image and a second image of the field of view, respectively. Base identification/sequencing is implemented based on the first image and the second image of different sequencing reactions and by combining information of the first image and the second image of the same sequencing reaction.

In some embodiments, the first lens 16 comprises one or more lenses, and the second lens 18 comprises one or more lenses. Specifically, in a microscope system, the one or more lenses of the first lens 16 form an objective lens; and the one or more lenses of the second lens 18 form a tube lens. In some other embodiments, the first lens 16 comprises one or more lenses, or the second lens 18 comprises one or more lenses.

In some embodiments, the optical system 10 comprises a second splitter 28 configured for receiving the first light beam from the first light source 12 and deflecting the first light beam to the first lens 16, such that the first light beam is integrated into an optical path (imaging optical path) in which an optical axis of the first lens is positioned. As such, the introduction of the second splitter 28 enables the arrangement of the first light source 12 outside the optical path in which the optical axis of the first lens 16 is positioned, allowing a compact and reasonable arrangement of elements of the optical system 10, facilitating the miniaturization and the industrial application of the optical system 10.

Specifically, the second splitter 28 is configured for deflecting the first light beam by 90 degrees. As such, the position at which the first light source 12 is conveniently arranged comprises the relative positions of the components of the first light source.

In some embodiments, the optical system 10 comprises a third splitter 30 and an autofocus module 32. The autofocus module 32 is configured for emitting a fourth light beam, and for receiving the fourth light beam reflected by the surface of the glass wherein the sample 24 immobilized. The third splitter 30 is configured for receiving the fourth light beam and deflecting the fourth light beam to the first lens 16, and is further configured for receiving the fourth light beam reflected by the surface and deflecting the fourth light beam to the autofocus module 32. As such, focusing(focus tracking) can be realized by using the autofocus module 32, and image acquisition can be realized by using the optical system 10.

Specifically, the autofocus module 32 comprises a second light source 34 and a receiver 36, wherein the second light source 34 is configured for emitting the fourth light beam to the third splitter 30, and the receiver 36 is configured for receiving the fourth light beam collimated by the first lens 16. In one example, the second light source 34 may be an infrared light source. The receiver 36 may be a photodiode. During focusing(focus tracking), the second light source 34 emits the fourth light beam that is deflected to the first lens 16 by the third splitter 30 and then converged to the surface through the first lens 16. The fourth light beam reflected by the surface is collimated to the third splitter 30 by the first lens. At this time, by determining the change in the information of the fourth light beam reflected by the surface received by the receiver 36, a movable platform carrying the sample move the sample 24 toward or away from the first lens 16, to make the sample 24 in focus.

In one example, the receiver 36 comprises a sensor, for example, a two-dimensional PSD sensor, and the second light source 34 comprises an LED (light source) and a mask positioned in front of the LED. The light emitted by the LED penetrates the mask to form a secondary source with a specific pattern. The secondary source with the specific pattern is deflected to the first lens 16 through the third splitter 30 and converged on the sample 24, and reflected to the sensor by the sample 24. The autofocus module 32 further comprises a signal processing module, wherein the sensor is connected to the signal processing module to acquire information of the secondary source through the signal processing module. Further, the autofocus module 32 further comprises a signal output module for outputting the change of the information of the secondary source, such that the platform carrying the sample moves the sample to the focal plane of the imaging optical path (for example, a fluorescence optical path).

Figure 4:
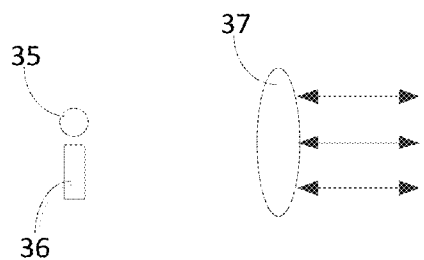
FIG. 4 is a structural schematic of the second light source according to the embodiments of the present disclosure.

In some embodiments, as shown in FIG. 4, the second light source 34 comprises a second light emitter 35 and a fifth lens 37, wherein the fourth light beam is a light beam emitted by the second light emitter 35 and collimated by the fifth lens 37. The fourth light beam reflected by the sample 24 is converged to the receiver 36 through the fifth lens 37.

In some embodiments, as shown in FIG. 3, the second light beam is the focused light beam from the second lens 18 transmitting through the first splitter 14. The optical system 10 comprises a compensation lens 38 positioned between the first splitter 14 and the first camera 20, and configured for compensating astigmatism introduced by the second light beam.

Figure 5:
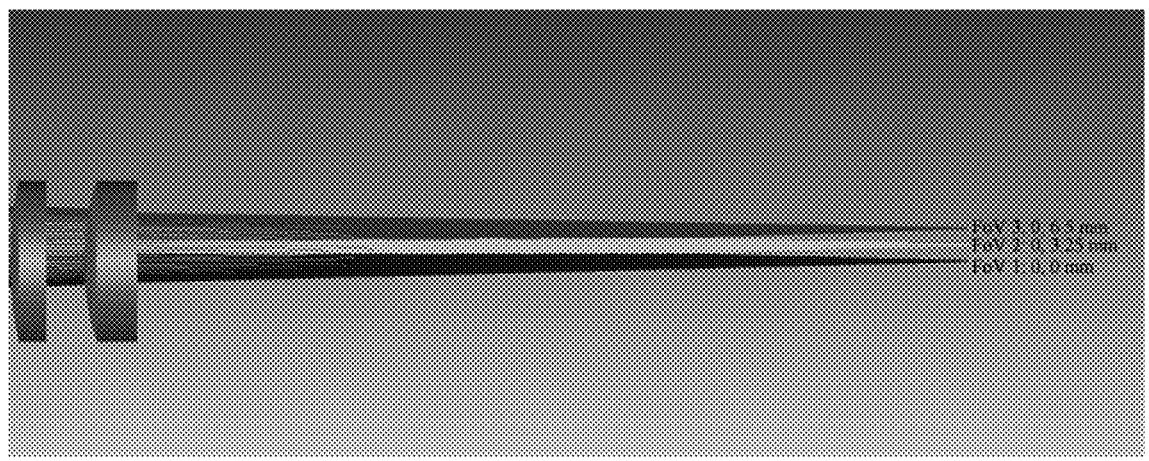
FIG. 5 is a schematic showing a simulation result of the spot size of the imaging light beam when the optical system according to the embodiments of the present disclosure does not comprise a first splitter.
Figure 5:
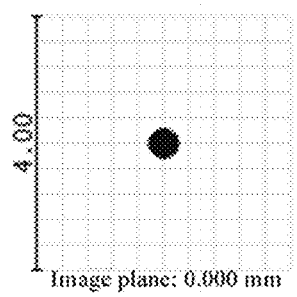
Figure 5:
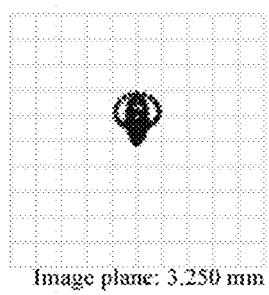
Figure 5:
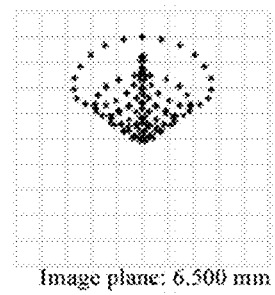
Figure 6:
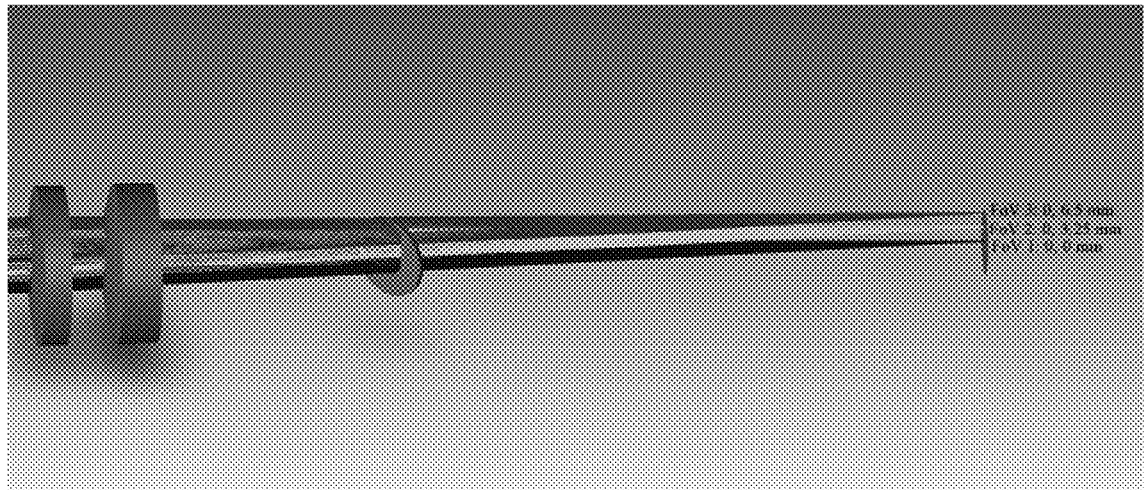
FIG. 6 is a schematic showing a simulation result of the spot size of the imaging light beam when the optical system according to the embodiments of the present disclosure comprises the first splitter.
Figure 6:
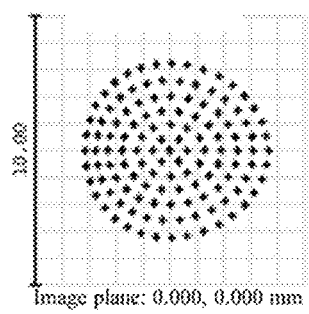
Figure 6:
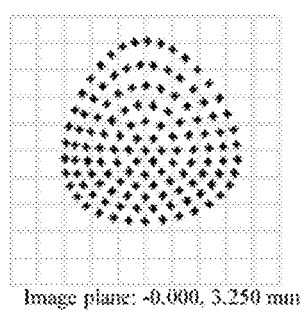
Figure 6:
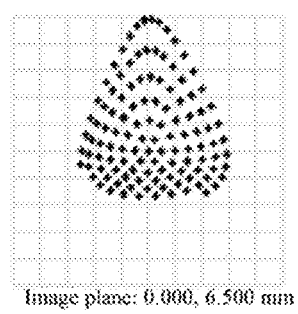

Specifically, in some examples, when (imaging) simulation is performed on the focused light beam of the second lens 18 by a software (for example, Zemax), the results of simulation with or without the first splitter 14 after the second lens 18 (whether the light beam is split or not after focusing) are respectively shown in FIGS. 5 and 6. It can be seen that, compared with spots (speckles/diffraction spots) formed by the light beam only passing through the second lens 18, spots (speckles/diffraction spots) formed by the light beam from the same field of view (FoV) passing through the second lens 18 and the first splitter 14 demonstrate significantly increased astigmatism. For example, the spot sizes at coordinates (0,0), (0,3.250) and (0,6.500) in FIG. 6 are larger than the spot sizes at the corresponding coordinates in FIG. 5. By using RMS radius (root mean square radius), the spot size actually imaged by an optical system can be quantitatively described. The RMS radius is an important radius parameter, and is a square root of the quadratic sum of the coordinates of the speckles (with reference to the center point) divided by the number of speckles. This radius reflects the size of a typical speckle, so as to quantitatively reflect the resolution of the system. In addition, GEO radius may be used to represent the diameter of the diffuse spot. It is clear that, for the spots formed by the focusing of the light beams of the same field of view, FIG. 6 demonstrates a more significant astigmatism (astigmation) with a larger RMS radius compared with FIG. 5.

Figure 7:
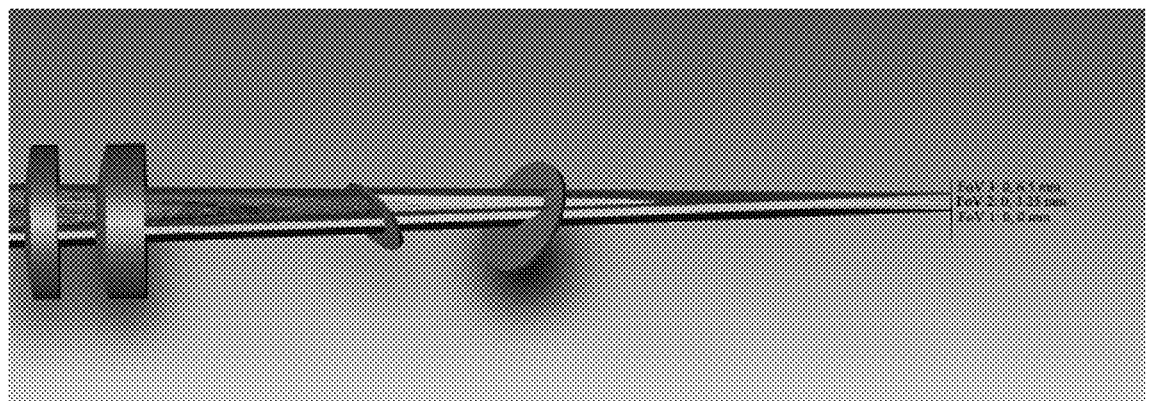
FIG. 7 is a schematic showing a simulation result of the spot size of the imaging light beam when a compensation lens is introduced into the optical system according to the embodiments of the present disclosure.
Figure 7:
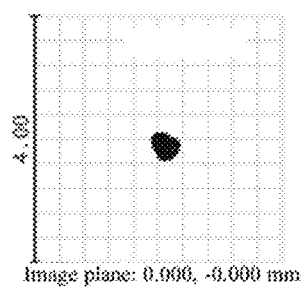
Figure 7:
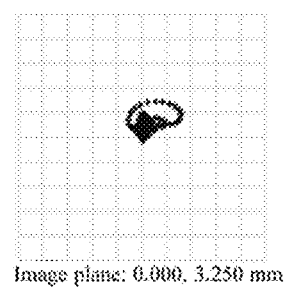
Figure 7:
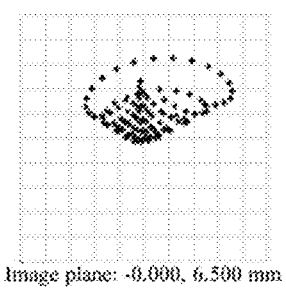

On this basis, in some examples, the inventor introduced the compensation lens 38 at any position between the second lens 18 and the first camera in the hope of compensating for the astigmatism caused by imaging after the transmission of the light beam. After the compensation lens 38 is introduced, as shown in FIG. 7, for spots formed by the light beams from the same field of view, the spot size of FIG. 7 is significantly smaller than that of FIG. 6, and at the same coordinates, the spot size of FIG. 7 approaches or even is smaller than that of FIG. 5 regarding the RMS radius.

Figure 8:
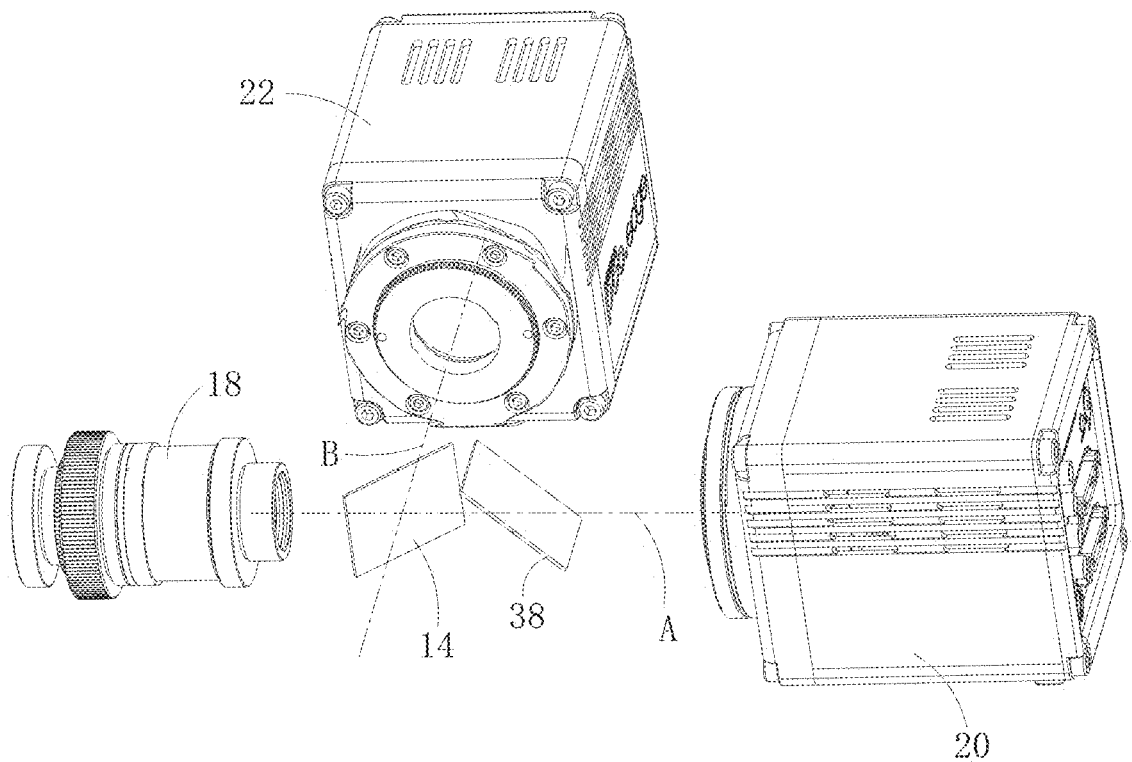
FIG. 8 is a partial three-dimensional schematic of the optical system according to the embodiments of the present disclosure.
Figure 9:
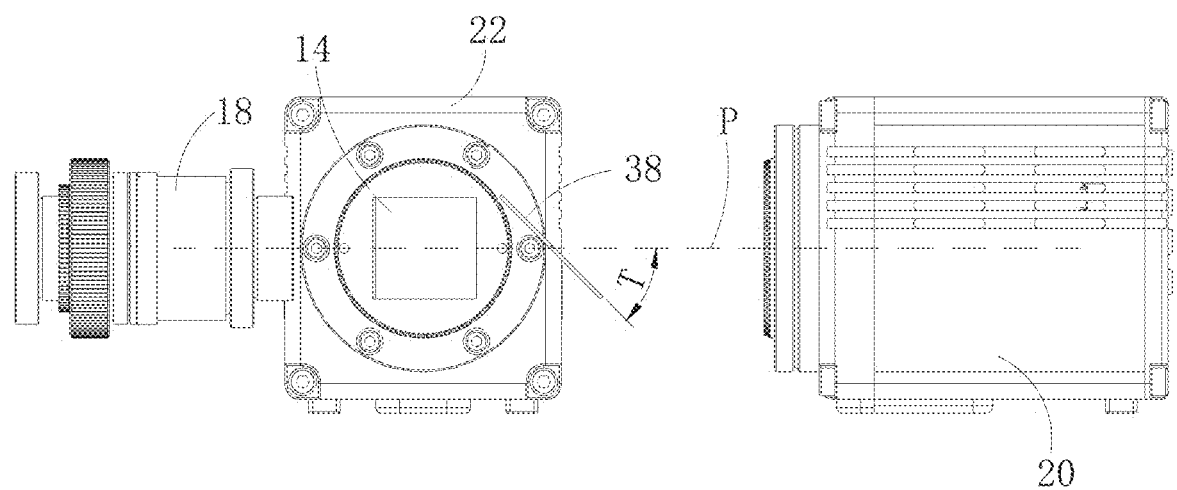
FIG. 9 is a front view of the optical system of FIG. 8.
Figure 10:
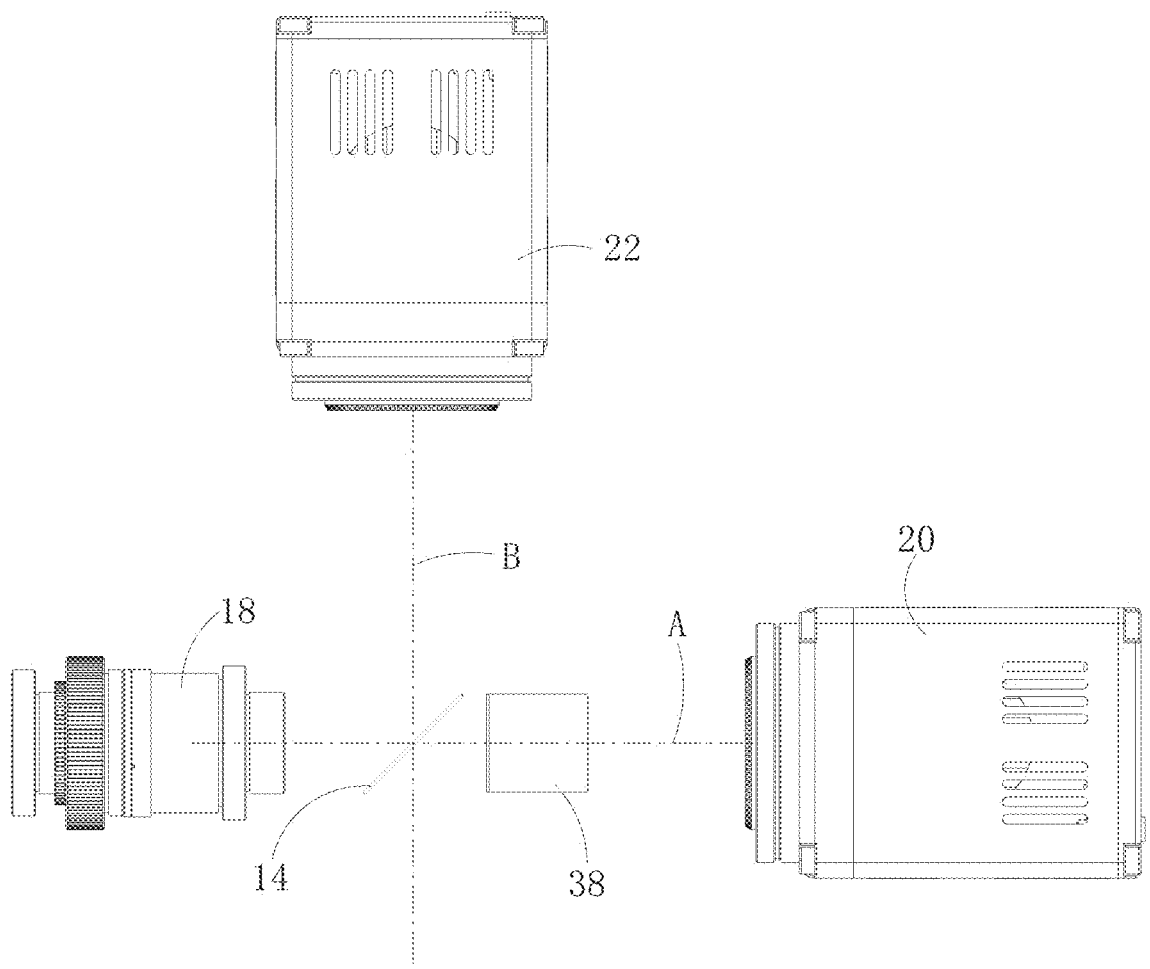
FIG. 10 is a top view of the optical system of FIG. 8.

The compensation lens 38 may be a parallel flat plate or a dichroic mirror. In the embodiments of FIGS. 8-10, the compensation lens 38 is a dichroic mirror. The compensation lens 38 is at an included angle T of 45 degrees to a plane P perpendicular to the first splitter 14, and the plane P is defined by an optical axis A of the second light beam and an optical axis B of the third light beam.

Figure 11:
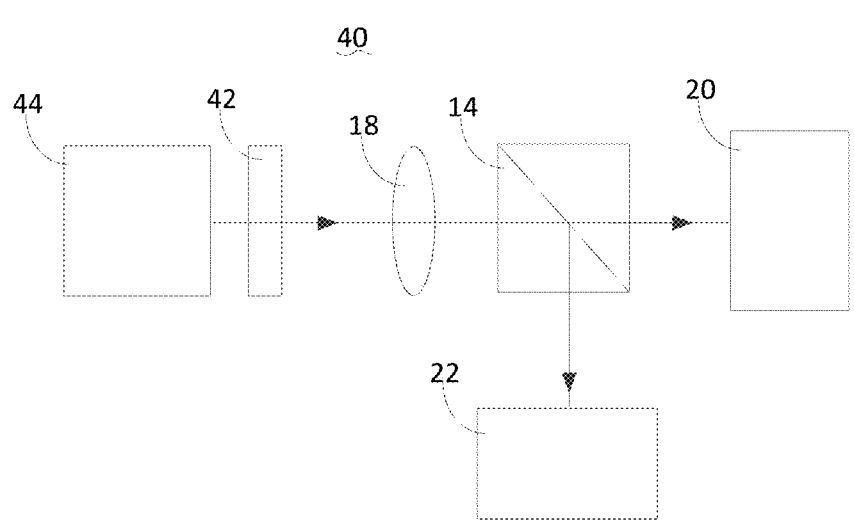
FIG. 11 is a structural schematic of the light splitting module during adjusting according to the embodiments of the present disclosure.

One embodiment of the present disclosure, as shown in FIG. 11, further provides a method for calibrating an optical system, wherein the optical system comprises a light splitting module 40 comprising a second lens 18, a first splitter 14, a first camera 20 and a second camera 22, and the second lens 18, the first splitter 14, and the first camera 20 are sequentially arranged along an optical axis of the second lens 18, the method comprising: emitting a collimated light beam to the second lens 18 using a collimator 50 comprising a target 42, the target 42 comprising one or more patterns; converging the collimated light beam to the first splitter 14 through the second lens 18 and splitting the converged light beam into a second light beam and a third light beam through the first splitter 14; receiving, by the first camera 20, the second light beam to acquire a first image of the patterns; receiving, by the second camera 22, the third light beam to acquire a second image of the patterns; and adjusting an angle and/or position of the first camera 20 and/or the second camera 22 to align the contrasts of the patterns in the first image and in the second image.

According to the method for calibrating the optical system, the light splitting module 40 is adjusted as a module independent from the whole optical system 10, which eliminates the limit of adjusting the whole optical system, conveniently realizes the alignment of the lens included in the optical system and cameras to meet a specified requirement (e.g., make a plurality of cameras perpendicular to an optical axis), and is desirable for quickly calibrating an optical system comprising a splitting optical path.

Figure 12:
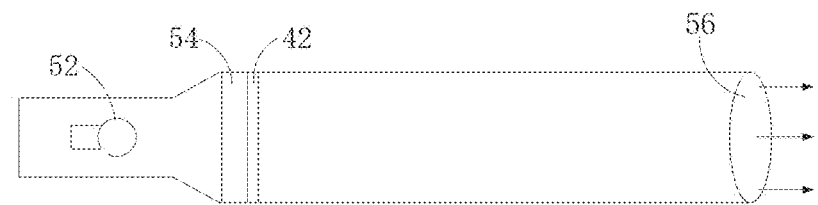
FIG. 12 is a structural schematic of the collimator according to the embodiments of the present disclosure.

Specifically, in this embodiment, as shown in FIG. 12, the collimator 50 further comprises a third light source 52, a ground glass 54(frosted glass/scattering glass) and an objective lens 56, wherein the third light source 52, the ground glass 54, the target 42 and the objective lens 56 are sequentially arranged, and light beam emitted by the third light source 52 sequentially passes through the ground glass 54, the target 42 and the objective lens 56 and penetrates to the second lens 18. The collimated light beam emitted by the collimator 50 is a parallel light beam, and the parallel light beam is incident to the first splitter 14 through the second lens 18 and is split into the second light beam and the third light beam.

In this embodiment, the patterns of the target 42 of the first image acquired by the first camera 20 are consistent in contrast, and the patterns of the target 42 of the second image acquired by the second camera 22 are consistent in contrast, indicating that the plane of the image sensor of the first camera 20 is perpendicular to the optical axis of the second lens 18, and the plane of the image sensor of the second camera 22 is perpendicular to the optical axis of the splitting optical path.

Figure 13:
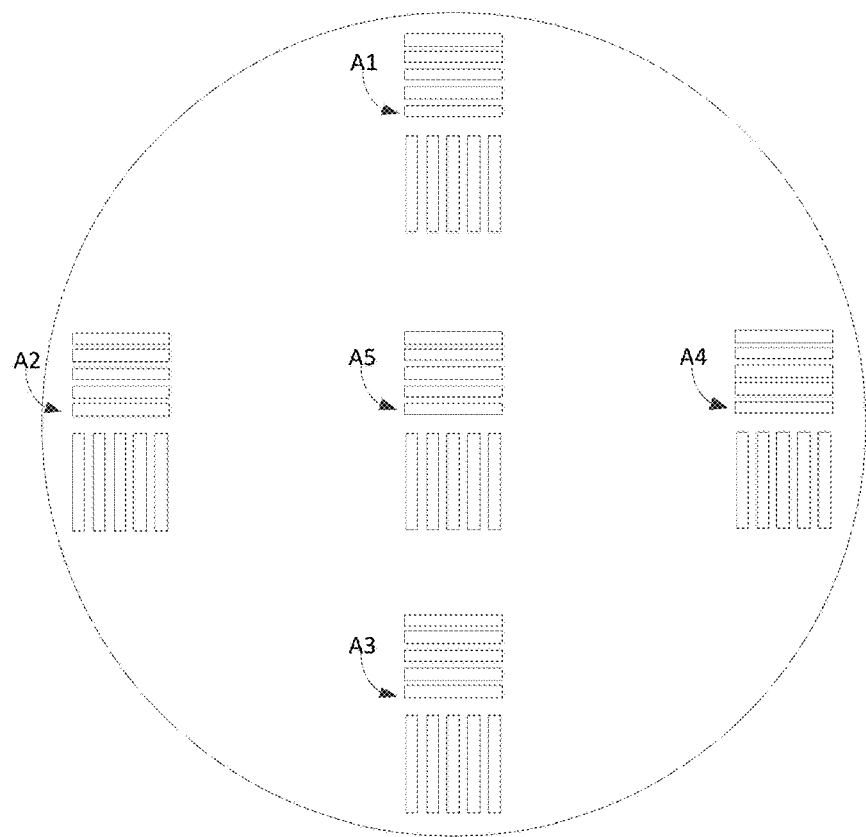
FIG. 13 is a schematic of a pattern of the target with resolution line pairs according to the embodiments of the present disclosure.

In this embodiment, the target 42 is a customized target with resolution line pairs designed by the inventor, as shown in FIG. 13. The target with resolution line pairs comprises 5 patterns A1-A5 distributed at different positions. When the contrasts are consistent for corresponding images of patterns A1-A5 of the target 42 acquired by the first camera 20 and the second camera 22, it is determined that the plane of the image sensor of the first camera 20 is perpendicular to the optical axis of the second lens 18, and the plane of the image sensor of the second camera 22 is perpendicular to the optical axis of the light beam reflected by the first splitter 14, which meets the requirements for sequencing image acquisition.

In some embodiments, if the MTF values (Modulation Transfer Function values) of the multiple images of the patterns are the same, the contrast of the images is determined to be consistent. In some examples, if the difference of two or more MTF values is less than 10%, preferably less than 5%, the MTF values are determined to be the same. Specifically, the MTF values of the first image of the patterns A1-A5 are 0.80, 0.80, 0.80, 0.80 and 0.80, respectively, and the MTF values of the second image of the patterns A1-A5 are 0.80, 0.78, 0.78, 0.80 and 0.80, respectively. Thus the contrast of the first image and the second image is determined to be consistent, and the optical system 10 is calibrated. The closer the MTF value approaches 1, the better the performance of the optical system 10 is.

In some embodiments, the target 42 has a plurality of patterns, as shown in FIG. 13. The size(pattern area) of the first image or the second image is the size of a circle formed by the 5 patterns A1-A5. When the optical system 10 is designed, it is required that the size of the first image and/or the second image is not less than forty percent of the size of the image actually required by the optical system 10 for imaging. As such, when imaging is performed by using the optical system 10, images of high quality can be acquired, and the requirements of sequencing are met.

Specifically, the size of the first image may refer to the size of an image formed by the distribution of the images of the plurality of patterns on the first camera 20. The size of the second image may refer to the size of an image formed by the distribution of the images of the plurality of patterns on the second camera 22. Preferably, the size of the first image and/or the second image is not less than fifty percent of the size of the image actually imaged by the optical system.

Figure 14:
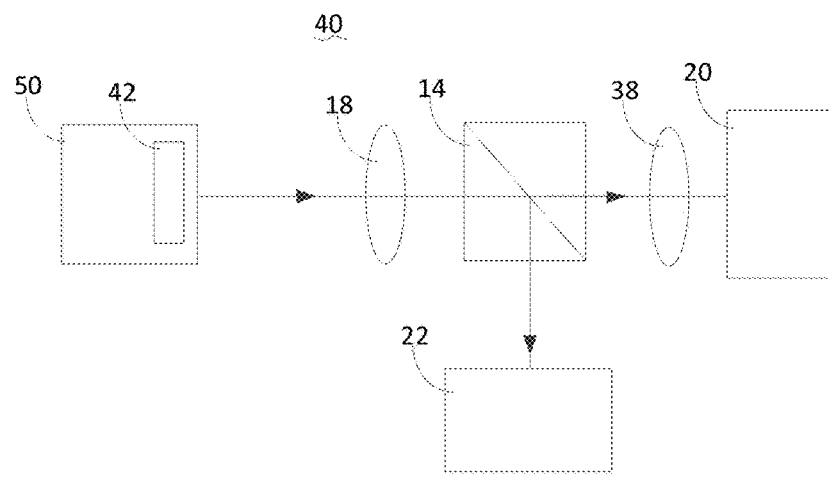
FIG. 14 is another structural schematic of the light splitting module during adjusting according to the embodiments of the present disclosure.
Figure 15:
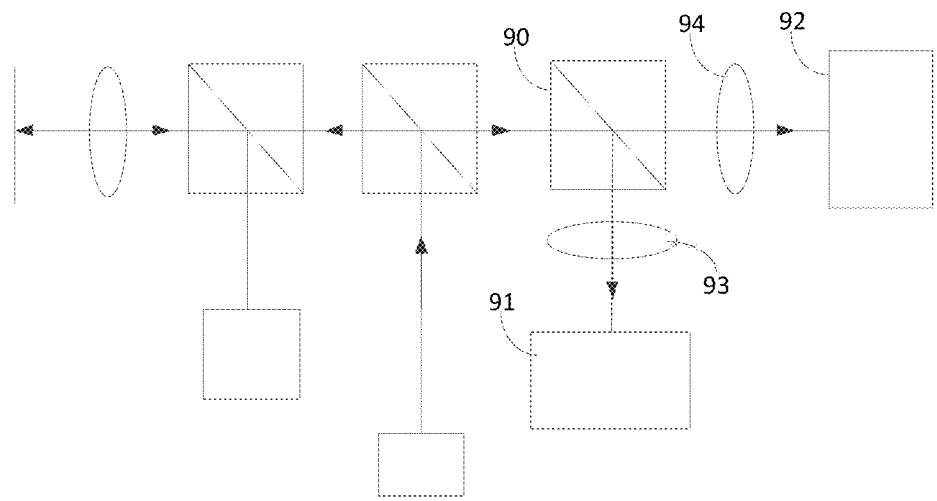
FIG. 15 is a structural schematic of an optical system of the related art.

In some embodiments, as shown in FIG. 14, the light splitting module 40 further comprises a compensation lens 38, wherein the compensation lens 38 is positioned between the first splitter 14 and the first camera 20, and the first camera 20 receives the second light beam passing through the compensation lens 38 to acquire the first image. As such, the imaging of the first image features good effect.

Figure 16:
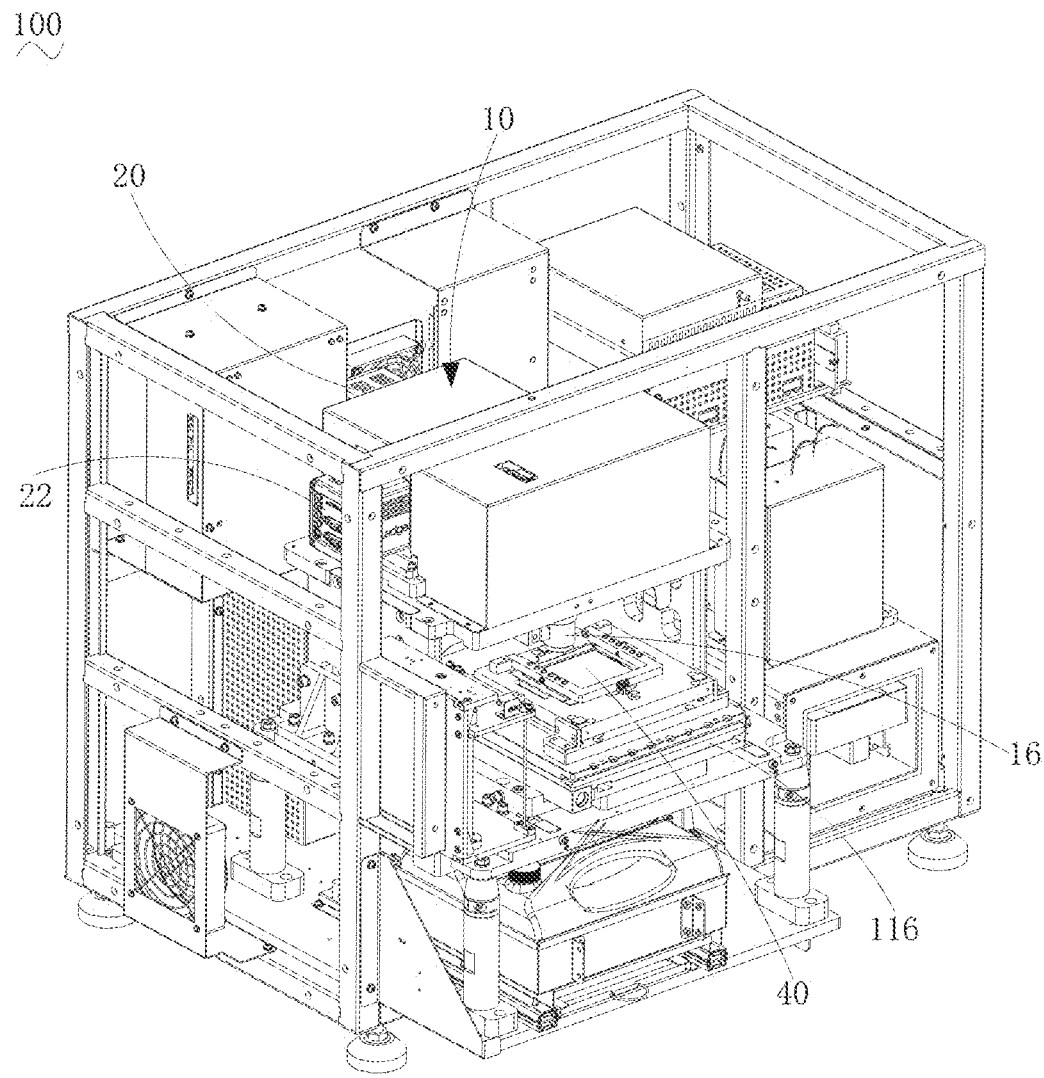
FIG. 16 is a three-dimensional schematic of a sequencing system according to the embodiments of the present disclosure.

In one embodiment of the present disclosure, as shown in FIG. 16, provided is a sequencing system 100 comprising a platform 116 for carrying a sample 24 and the optical system 10 according to any of the aforementioned embodiments.

The sequencing system 100 comprises the optical system 10 with any of the aforementioned technical features and advantages, and is thus compact and is beneficial to the miniaturization and industrialization.

Specifically, in this embodiment, the platform 116 is movable. The platform 116 moves the sample 24 relative to the optical system, for example, in a direction perpendicular to the optical axis of the first lens 16, or in a direction parallel to the optical axis of the first lens 16, or in a direction oblique to the optical axis of the first lens 16, such that different positions of the sample 24 are positioned directly under the first lens 16, and image acquisition on the sample 24 can be realized by the sequencing system 100 comprising the optical system 10, so as to perform the sequencing.

It can be understood that the sequencing system 100 in the embodiment of the present disclosure may comprise the optical system 10 according to any one of the aforementioned embodiments.

In the description of the present specification, the description with reference to the terms "one embodiment", "some embodiments", "exemplary embodiments", "example", "specific example", or "some examples" means that the specific features, structures, materials or characteristics described in combination with the embodiments or examples are included in at least one embodiment or example of the present disclosure. In this specification, the schematic description of the aforementioned terms does not necessarily refer to the same embodiment or example. Moreover, the specific features, structures, materials or characteristics described may be combined in any one or more embodiments or examples in an appropriate manner.

Although the embodiments of the present disclosure have been illustrated and described, it can be understood by those of ordinary skill in the art that various changes, modifications, replacements and variations can be made to these embodiments without departing from the principle and purpose of the present disclosure, and the scope of the present disclosure is defined by the claims and equivalents thereof.

What is claimed is:

1. An optical system, comprising a first light source, a first lens, and a light splitting module, wherein the light splitting module comprises a first splitter, a second lens, a first camera, and a second camera;
   the first lens is configured for receiving a first light beam from the first light source and collimating the first light beam onto a sample, and for receiving and collimating a light beam from the sample;
   the second lens is configured for focusing the collimated light beam from the first lens to the first camera and the second camera;
   the first splitter is configured for splitting the focused light beam from the second lens into a second light beam and a third light beam;
   the first camera is configured for receiving the second light beam; and
   the second camera is configured for receiving the third light beam.

2. The optical system according to claim 1, wherein the first light source comprises a first light emitter and a third lens, the optical system comprises a fourth lens, the first light beam is a light beam emitted by the first light emitter and collimated by the third lens, and is focused on a back focal plane of the first lens by a fourth lens and then collimated onto the sample by the first lens.

3. The optical system according to claim 1, comprising a second splitter configured for receiving the first light beam from the first light source and deflecting the first light beam to the first lens.

4. The optical system according to claim 3, comprising a third splitter and an autofocus module;
wherein the autofocus module is configured for emitting a fourth light beam and for receiving the fourth light beam reflected by the sample; and
the third splitter is configured for receiving the fourth light beam and deflecting the fourth light beam to the first lens, and is further configured for receiving the fourth light beam reflected by the sample and deflecting the fourth light beam to the autofocus module.

5. The optical system according to claim 4, wherein the autofocus module comprises a second light source for emitting the fourth light beam to the third splitter and a receiver for receiving the fourth light beam reflected by the sample.

6. The optical system according to claim 4, wherein the fourth light beam is converged on the sample through the first lens; and
the fourth light beam reflected by the sample is collimated to the third splitter by the first lens.

7. The optical system according to claim 5, wherein the second light source comprises a second light emitter and a fifth lens, the fourth light beam is a light beam emitted by the second light emitter and collimated by the fifth lens, and the fourth light beam reflected by the sample is converged to the receiver through the fifth lens.

8. The optical system according to claim 1, wherein the first lens comprises one or more lenses, and the second lens comprises one or more lenses.

9. The optical system according to claim 1, wherein the first camera and the second camera are arranged at 90 degrees or 270 degrees.

10. The optical system according to claim 3, wherein the second splitter is configured for deflecting the first light beam by 90 degrees.

11. The optical system according to claim 1, wherein the second light beam is the focused light beam from the second lens transmitting through the first splitter; and the optical system comprises a compensation lens positioned between the first splitter and the first camera, and configured for compensating astigmatism introduced by the second light beam.

12. The optical system according to claim 11, wherein the compensation lens is at an included angle of 45 degrees to a plane perpendicular to the first splitter, and the plane is defined by an optical axis of the second light beam and an optical axis of the third light beam.

13. A sequencing system, comprising a platform for carrying a sample and the optical system according to claim 1.

14. A method for calibrating an optical system, wherein the optical system comprises a light splitting module included in the optical system of claim 1, the light splitting module comprises the second lens, the first splitter, the first camera and the second camera, and the second lens, the first splitter and the first camera are sequentially arranged along an optical axis of the second lens, the method comprising:
emitting a collimated light beam to the second lens using a collimator comprising a target, the target comprising one or more patterns;
converging the collimated light beam to the first splitter through the second lens and splitting the collimated light beam into a second light beam and a third light beam through the first splitter;
receiving, by the first camera, the second light beam to acquire a first image of the pattern;
receiving, by the second camera, the third light beam to acquire a second image of the pattern; and
adjusting an angle and/or position of the first camera and/or the second camera to align contrasts of the patterns in the first image and in the second image.

15. The method according to claim 14, wherein the target has a plurality of patterns, and a size of the first image and/or the second image is not less than forty percent of the size of the image imaged by the optical system.

16. The method according to claim 14, wherein the light splitting module further comprises a compensation lens positioned between the first splitter and the first camera, and the first camera receives the second light beam passing through the compensation lens to acquire the first image.

17. The method according to claim 16, wherein the compensation lens is at an included angle of 45 degrees to a plane perpendicular to the first splitter, and the plane is defined by an optical axis of the second light beam and an optical axis of the third light beam.

18. The optical system according to claim 1, comprising a third splitter and an autofocus module;
wherein the autofocus module is configured for emitting a fourth light beam and for receiving the fourth light beam reflected by the sample; and
the third splitter is configured for receiving the fourth light beam and deflecting the fourth light beam to the first lens, and is further configured for receiving the fourth light beam reflected by the sample and deflecting the fourth light beam to the autofocus module.

19. The optical system according to claim 5, wherein the fourth light beam is converged on the sample through the first lens; and
the fourth light beam reflected by the sample is collimated to the third splitter by the first lens.

20. The optical system according to claim 1, wherein the first lens comprises one or more lenses, or the second lens comprises one or more lenses.

* * * * *